(12) United States Patent
Hashimoto et al.

(10) Patent No.: US 8,611,712 B2
(45) Date of Patent: Dec. 17, 2013

(54) RUBBER MEMBER, ADHESIVE CONNECTING MEMBER, AND OPTICAL CONNECTION STRUCTURE

(75) Inventors: Nobuhiro Hashimoto, Shizuoka (JP); Tomoki Furue, Shizuoka (JP); Makoto Gotou, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 334 days.

(21) Appl. No.: 12/935,481

(22) PCT Filed: Mar. 24, 2009

(86) PCT No.: PCT/JP2009/001296
§ 371 (c)(1),
(2), (4) Date: Oct. 18, 2010

(87) PCT Pub. No.: WO2009/122674
PCT Pub. Date: Oct. 8, 2009

(65) Prior Publication Data
US 2011/0026881 A1 Feb. 3, 2011

(30) Foreign Application Priority Data

Mar. 31, 2008 (JP) .................. 2008-092598
Dec. 23, 2008 (JP) .................. 2008-326684

(51) Int. Cl.
*G02B 6/26* (2006.01)
(52) U.S. Cl.
USPC .......................................... 385/38
(58) Field of Classification Search
None
See application file for complete search history.

(56) References Cited

U.S. PATENT DOCUMENTS

| | | | |
|---|---|---|---|
| 3,455,625 A * | 7/1969 | Ferris et al. | 385/54 |
| 4,325,607 A * | 4/1982 | Carlsen | 385/70 |
| 4,436,366 A * | 3/1984 | Abramson | 385/31 |
| 4,900,125 A | 2/1990 | Iyer | |
| 5,134,676 A * | 7/1992 | Boillot et al. | 385/72 |
| 5,613,026 A * | 3/1997 | Nagata et al. | 385/94 |
| 6,203,208 B1 * | 3/2001 | Stupar | 385/73 |
| 6,254,282 B1 * | 7/2001 | Ishihara et al. | 385/73 |
| 6,501,900 B1 * | 12/2002 | King et al. | 385/140 |
| 6,623,174 B2 * | 9/2003 | Perko et al. | 385/78 |
| 6,785,125 B1 * | 8/2004 | Young | 361/679.08 |
| 7,650,056 B2 * | 1/2010 | Chen | 385/146 |

(Continued)

FOREIGN PATENT DOCUMENTS

| EP | 0 351 803 A2 | 1/1990 |
|---|---|---|
| EP | 1 686 402 A1 | 8/2006 |

(Continued)

OTHER PUBLICATIONS

FitWell (R) (Refractive Index Matching Film). Catalog pages retrieved from http://opt.tomoegawa.co.jp/images/english/catalog/catalog-fit.pdf, copyright date 2006.*

(Continued)

*Primary Examiner* — Mike Stahl
(74) *Attorney, Agent, or Firm* — Arent Fox LLP

(57) ABSTRACT

A rubber member optically connects (a) an optical transmission medium or an optical component and (b) another optical transmission medium or another optical component by intervening between the (a) and the (b). An adhesive connecting member comprises a rubber member having a refractive index of 1.35 to 1.55 and an adhesive having a refractive index of 1.35 to 1.55.

12 Claims, 2 Drawing Sheets

(56) References Cited

U.S. PATENT DOCUMENTS

| | | | |
|---|---|---|---|
| 7,985,461 B2* | 7/2011 | Hashimoto et al. | 428/138 |
| 8,137,001 B2* | 3/2012 | Shacklette et al. | 385/55 |
| 2007/0086707 A1 | 4/2007 | Suzuki et al. | |
| 2007/0087174 A1* | 4/2007 | Aizpuru et al. | 428/209 |
| 2010/0124394 A1* | 5/2010 | Meek et al. | 385/73 |
| 2012/0141071 A1* | 6/2012 | Duis et al. | 385/72 |

FOREIGN PATENT DOCUMENTS

| | | | |
|---|---|---|---|
| JP | 55-153912 A | * | 12/1980 |
| JP | 05-034532 A | | 2/1993 |
| JP | 09-050704 A | | 2/1997 |
| JP | 2932471 B2 | | 8/1999 |
| JP | 11-258476 A | | 9/1999 |
| JP | 2001-324641 A | * | 11/2001 |
| JP | 2002-207139 A | | 7/2002 |
| JP | 2006-221031 A | | 8/2006 |
| JP | 2007-093647 A | | 4/2007 |

OTHER PUBLICATIONS

Extended Supplementary European Search Report dated Apr. 12, 2012 issued in corresponding European Application No. 09727504.4.

* cited by examiner

RUBBER MEMBER, ADHESIVE CONNECTING MEMBER, AND OPTICAL CONNECTION STRUCTURE

CROSS-REFERENCE TO RELATED APPLICATION

This application is a National Stage entry of International Application No. PCT/JP2009/001296, filed Mar. 24, 2009, which claims priority to Japanese Application No. 2008-092598, filed Mar. 31, 2008 and Japanese Application No. 2008-326684, filed Dec. 23, 2008, the disclosure of the prior application is hereby incorporated in its entirety by reference.

TECHNICAL FIELD

The present invention relates to a rubber member, an adhesive connecting member, and an optical connection structure.

BACKGROUND ART

Optically transmission efficiency of an optical transmission path using optical fibers is greatly influenced by optically connecting loss at an optical connection part between the optical fibers or the optical fiber and an optical component such as an optical semiconductor, etc., in the optical transmission path. As causes of optically connecting loss in this connection part, imperfect alignment of the optical fibers, inclination of axes of the optical fibers, clearance between end surfaces of the optical fibers, etc., can be mentioned, and moreover, inclination, roughness, and swelling of the end surface of the optical fiber can be also mentioned as causes of optically connecting loss.

In order to effectively overcome these causes, a method using a high-precision connecting apparatus, a method in which high grade polishing processing is carried out on an end surface of an optical fiber, etc., can be mentioned. However, in the above methods, there is a problem in that the connection of the optical fibers requires a great deal of time and effort, and connection cost is increased.

In addition, as another method, an optical connection structure using an adhesive connecting member in which optically connecting loss as a problem in optical communication can be reduced by adhering to a top of an optical fiber, has been proposed (for example, see Patent Publication 1).

The optical connection structure will be explained with reference to FIG. 5.

FIG. 5 is a side view showing an optical connection structure using a conventional adhesive connecting member.

Reference numerals 10a and 10b indicate an optical fiber, and reference numeral 21 indicates a conventional adhesive connecting material.

In FIG. 5, the adhesive connecting member 21 is intervened in an adhered condition between connecting surfaces of the optical fiber 10a and the optical fiber 10b. The two optical fibers 10a and 10b are contacted by way of the adhesive connecting member 21, and thereby the optical fibers are optically connected.

However, the conventional adhesive connecting member cannot be easily retried if it fails to adhere at a suitable position. In addition, in the case in which the conventional adhesive connecting member is used for a connector that was strongly contacted, such as an SC connector, an LC connector, etc., is often broken.

Patent Publication 1 is Japanese Unexamined Patent Application Publication No. 2006-221031.

DISCLOSURE OF THE INVENTION

Problems Solved by the Invention

The present invention was completed in view of the above-described circumstances, and an object of the present invention is to provide a rubber member, an adhesive connecting member and an optical connection structure, in which the optically connecting loss can be decreased and the positioning can be retried without breaking.

Means for Solving the Problems

According to the present invention, the above problem can be solved by the following technical composition.

(1) A rubber member optically connecting (a) an optical transmission medium or an optical component and (b) another optical transmission medium or another optical component by intervening between the (a) and the (b).

(2) An adhesive connecting member comprising a rubber member having a refractive index of 1.35 to 1.55 and an adhesive having a refractive index of 1.35 to 1.55.

(3) The adhesive connecting member according to (2), wherein the rubber member and the adhesive are laminated.

(4) The adhesive connecting member according to (2), wherein the rubber member is styrenic rubber.

(5) The adhesive connecting member according to (2), wherein the rubber member is a copolymer having a polystyrene-poly(ethylene/propylene)block-polystyrene structure or a copolymer having a polystyrene-poly(ethylene/butylene) block-polystyrene structure.

(6) The adhesive connecting member according to (2), wherein the rubber member has a styrene content of 1 to 50 weight %.

(7) The adhesive connecting member according to (2), wherein the rubber member has type A durometer hardness by Japan Industrial Standard (hereinafter referred to as JIS) of 50 to 100.

(8) The adhesive connecting member according to (2), wherein the rubber member has a thickness of 1 to 30 μm.

(9) The adhesive connecting member according to (2), wherein the ratio of thickness of the rubber member and the adhesive is 1:1 to 1:3.

(10) The adhesive connecting member according to (2), wherein the rubber member is an acrylic rubber.

(11) The adhesive connecting member according to (10), wherein the acrylic rubber has a glass transition temperature (Tg) of −30° C.

(12) The adhesive connecting member according to (10), wherein the acrylic rubber has a Mooney viscosity $ML_{1+4}$ (100° C.) of 40 or more.

(13) The adhesive connecting member according to (10), wherein the acrylic rubber has a transmittance at a wavelength of 850 to 1700 nm of 85% or more.

(14) The adhesive connecting member according to (2), wherein the adhesive comprises acrylic adhesive and hardener, and the hardener is epoxy hardener or isocyanate hardener.

(15) An optical connection structure in which (a) an optical transmission medium or an optical component and (b) another optical transmission medium or another optical component are connected by way of an adhesive connecting member, wherein the adhesive connecting member comprises a rubber member and an adhesive.

(16) The optical connection structure according to (15), wherein the rubber member and the adhesive are laminated.

The present invention can provide a rubber member, an adhesive connecting member and an optical connection structure, in which the optically connecting loss can be decreased and the positioning can retried without breaking.

EXPLANATION OF REFERENCE SYMBOLS 10a, 10b . . . optical fiber,
11a-14a, 11b-14b . . . optical fiber,
15a, 15b . . . optical fiber tape core,
21 . . . conventional adhesive connecting member,
22 . . . adhesive connecting member of the present invention,
22a . . . adhesive,
22b . . . rubber member,
30 . . . optical component,
47a, 47b . . . guide pin,
75a, 75b . . . MT connector,
80 . . . SC connector,
90 . . . adopter for SC connector,
H . . . guide pin insertion hole

BEST MODE FOR CARRYING OUT THE INVENTION

Embodiment 1 will be explained with reference to FIG. 1.

Figure 1:
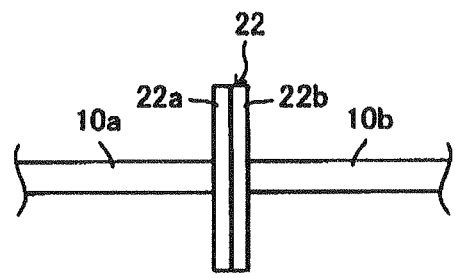
FIG. 1 is a side view showing Embodiment 1 of an optical connection structure using an adhesive connecting member of the present invention.

FIG. 1 is a side view showing Embodiment 1 of an optical connection structure using an adhesive connecting member of the present invention.

Reference numeral 10a indicates an optical fiber, which is an optical transmission medium, reference numeral 10b indicates an optical fiber, which is another optical transmission medium, reference numeral 22 indicates an adhesive connecting member, reference numeral 22a indicates an adhesive, and reference numeral 22b indicates a rubber member.

The optical connection structure according to Embodiment 1 of the present invention is formed by connecting the optical fiber 10a and the optical fiber 10b by way of the adhesive connecting member 22, and the adhesive connecting member 22 consists of the rubber member 22b and the adhesive 22a.

It is preferable that the rubber member 22b and the adhesive 22a be laminated. Here, the adhesive 22a and the rubber member 22b may be arranged so as to contact therewith, and another refractive index matching agent may be sandwiched between the adhesive 22a and the rubber member 22b.

The optical connection structure of Embodiment 1 has a structure in which two optical fibers 10a and 10b are optically connected by contacting therewith by way of the adhesive connecting member 22, as shown in FIG. 1.

Here, the optical fiber 10a and the adhesive connecting member 22 are firmly adhered.

The adhesive connecting member 22 and the optical fiber 10b are not adhered.

Therefore, the adhesive connecting member 22 and the optical fiber 10b are separated by detaching the optical fiber 10a and the adhesive connecting member 22, and thereby, the optical fiber 10b can be easily retried.

Here, although the adhesive connecting member 22 is contacted with the optical fiber 10b, each time the positioning is retried, it is not broken since the rubber member 22b having remarkably higher strength than that of the adhesive is contacted.

It is preferable that the refractive index of the rubber member 22b in the present invention be 1.35 to 1.55, and it is more preferable that it be 1.40 to 1.50.

According to the rubber member 22b in the present invention, the optical fiber 10a and the optical fiber 10b can be optically connected by intervening between the optical fiber 10a and the optical fiber 10b.

It is preferable that the rubber member 22b be styrenic rubber or acrylic rubber. It is preferable that the styrenic rubber be any one of styrene ethylene rubber, styrene propylene rubber, and styrene butadiene rubber, and more preferable that it be a copolymer having a polystyrene-poly(ethylene/propylene)block-polystyrene structure or copolymer having a polystyrene-poly(ethylene/butylene)block-polystyrene structure.

In addition, it is preferable that the styrene content of the rubber member 22b be 1 to 50 weight %, and it is more preferable that it be 10 to 30 weight %.

Furthermore, it is preferable that the primary component of the acrylic rubber be an alkyl acrylate such as ethyl acrylate, butyl acrylate, etc.

Additionally, it is preferable that the glass transition temperature (Tg) of the acrylic rubber −30° C. or more, and it is more preferable that it be −20° C. or more. When the glass transition temperature (Tg) is below −30° C., the acrylic rubber is easily broken by increasing tackiness at the surface thereof.

In addition, it is preferable that the Mooney viscosity $ML_{1+4}$ (100° C.) of the acrylic rubber be 40 or more, and it is more preferable that it be 50 or more.

It is preferable that the acrylic rubber be superior in transparency, and it is preferable that light transmittance at a wavelength to be used, that is, a wavelength of 850 to 1700 nm, be 85% or more. It is relatively easy for the transparency of the acrylic rubber to be increased by adjusting a cross-linking agent and hardener. It is more preferable that the light transmittance at a wavelength to be used be 90% or more.

Furthermore, the rubber material 22b preferably has type A durometer hardness by JIS of 10 to 100, and more preferable has of 50 to 100.

Here, the above hardness is a value measured according to JIS K-6253.

It is preferable that thickness of the rubber member 22b be 1 to 30 μm, and it is more preferable that it be 3 to 20 μm.

When the thickness is under 1 μm, the rubber member 22b is easily broken, and when it is greater than 30 μm, the optically connecting loss is increased. Here, it is most preferable that the hardness be 50 or more and the thickness be 3 to 20 μm, since it is difficult to break, and the optically connecting loss is also small.

As a rubber member in the present invention, commercially available types of rubber may be used.

Next, it is preferable that the refractive index of the adhesive 22a be 1.35 to 1.55, and it is more preferable that it be 1.40 to 1.50.

As the adhesive 22a, various polymer adhesives such as acrylic adhesive, epoxy adhesive, vinyl adhesive, silicone adhesive, rubber adhesive, urethane adhesive, methacrylic adhesive, nylon adhesive, bisphenol adhesive, diol adhesive, polyimide adhesive, fluorinated epoxy adhesive, fluorinated acrylic adhesive, etc., can be used. Additionally, these adhesives may be used in combination or by adding hardener or fluorocarbon resin, as necessary.

Of these, the acrylic adhesive and the silicone adhesive are preferably used, because of adhesiveness and other characteristics.

The acrylic adhesive used in the present invention means polymers constructed of alkyl ester in which a basic structure is acrylic acid and carbon number is 2 to 12, or alkyl ester in which a basic structure is methacrylic acid and a carbon number of 4 to 12, as a primary monomer. Specifically, an alkyl ester of an acrylic acid such as ethyl acrylate, n-butyl acrylate, isobutyl acrylate, 2-ethylhexyl acrylate, lauryl acrylate, benzyl acrylate, etc., and an alkyl ester of methacrylic acid such as n-butyl methacrylate, isobutyl methacrylate, 2-ethylhexyl methacrylate, lauryl methacrylate, benzil methacrylate, etc., can be mentioned. In addition, as a monomer for copolymerizing these primary monomers, methyl acrylate, methyl methacrylate, ethyl methacrylate, propyl methacrylate, vinyl acetate, acrylonitrile, methacrylonitrile, acrylamide, styrene, etc., can be used.

It is preferable that the acrylic adhesive be a material that is superior in transparency, and it is preferable that the light transmittance at a wavelength to be used, that is, at a wavelength of 850 to 1700 nm, be 85% or more. The acrylic adhesive is material in which the transparency can be relatively easily increased by adjusting a cross-linking agent and a hardener. It is more preferable that the light transmittance at a wavelength to be used be 90% or more.

The silicone adhesive used in the present invention means an adhesive in which a frame of a main chain includes an Si—O—Si bonding (siloxane bonding), and it is constructed of silicone rubber or silicone resin.

These are solidified and filmed by applying in a condition dissolved by organic solvent.

A primary polymer of the silicone rubber is straight-chained polydimethylsiloxane, and it also includes polymers in which some of the methyl groups are substituted with phenyl groups or vinyl groups.

In addition, as a silicone resin, resins having a complicated three-dimensional structure and having a molecular weight of about 3,000 to 10,000, can be used, in order to function as an adhesion imparting resin.

Here, a cross-linking agent, softener, adhesion modifier, and other additives may be added to the silicone adhesive, in order to adjust adhesive power or wettability and impart water resistance or heat resistance.

The silicone adhesive is characterized in that adhesive heat resistance is superior and adhesive power is superior under high temperatures or in a low temperature environment.

Therefore, according to the optical connection structure in which the silicone adhesive is intervened between an optical transmission medium and another optical transmission medium or an optical component, adhesion of the connection can be maintained and a connection condition which is always stabilized can be maintained, even under a high temperature environment (to 250° C.) or under a low temperature environment (to −50° C.).

In addition, the silicone adhesive can be preferably separated from an adhered structure without curing or yellowing, even if it is heated to a high temperature.

Furthermore, the silicone adhesive is superior in electrical insulation, chemical resistance, weather resistance, and water resistance, and it can be adhered to various materials, for example, an optical fiber in which a cladding layer is coated with a fluorocarbon resin, etc.

Additionally, it can also be effectively used in an optical waveguide or an optical component, since the adhesion is exhibited to a member made of a fluorocarbon resin such as fluorine polyimide, etc.

As a hardener, various epoxy hardeners and various isocyanate hardeners, etc., can be used. In addition, the adhesive may be cured by using a catalyst.

The adhesive power can be adjusted by combination of the adhesive and the hardener, a mixing amount thereof, etc.

It is necessary that the adhesive 22a have strong adhesive power so that the adhesive connecting member 22 does not separate from the optical fiber 10a, and it is preferable that the adhesive power be 20 to 2500 gf/25 mm, and it is more preferable that it be 100 to 2500 gf/25 mm.

Here, the adhesive power is a value measured according to JIS Z0237 180-degree peeling-off adhesive power.

It is preferable that a thickness of the adhesive 22a be 5 to 30 μm, and it is more preferable that it be 5 to 20 μm.

When the thickness is under 5 μm, the optical transmission medium and the optical component are not reliably connected in the case in which the surface of the optical transmission medium or the optical component is uneven, and in contrast, when it exceeds 30 μm, the optically connecting loss is increased.

It is preferable that the thickness ratio of the rubber member 22b and the adhesive 22a be from 1:1 to 1:3 from a viewpoint of handling.

In the present invention, the adhesive connecting member 22 comprises the rubber member 22b having a refractive index of 1.35 to 1.55 and the adhesive 22a having a refractive index of 1.35 to 1.55.

It is preferable that a difference of the rubber member 22b and the adhesive connecting member 22 be 0.03 or less.

The refractive index of the adhesive connecting member in the present invention may be any of approximate refractive indexes to (a) an optical transmission medium or an optical component and (b) another optical transmission medium or another optical component and is not limited to a specific range; however, it is preferable that the difference of an average value of the refractive indexes (a) and (b) and the refractive index of the adhesive connecting member 22 be 0.1 or less, and it is more preferable that it be 0.05 or less, from a viewpoint of the optically connecting loss due to avoidance of Fresnel reflection.

The adhesive connecting member 22 may be a sheet-like adhesive connecting member in a film shape, and it may be transformed by having elasticity.

As an optical transmission medium used in the present invention, optical waveguides, etc., can be mentioned in addition to the above optical fibers; however, they are not limited to specific types, and they may be any in which light is transmitted therein. In addition, the optical fiber is not specifically limited in any particular way, and it may be suitably selected depending on application thereof. For example, an optical fiber consisting of material such as quartz, plastic, etc., can be used. In addition, as an optical waveguide, a quartz optical waveguide, a polyimide optical waveguide, a PMMA optical waveguide, an epoxy optical waveguide, etc., can be utilized.

Furthermore, two optical transmission media to be used can be connected, even if the types thereof are different. In addition, in the case in which the optical transmission media in which core diameters and mode field diameters are the same, they can be applied to the present invention, even if the outer diameters are different. Here, the number of the optical fibers and the number of the optical waveguides are not limited to a specific range, and an optical fiber tape core comprising plural optical fibers can be used.

As an optical component used in the present invention, an optical lens, a filter, a measuring apparatus, a laser diode, a photodiodes, etc., can be mentioned, and they are not limited to specific types. As an optical lens, for example, lenses having various shapes such as a convex lens, a concave lens, a convexoconcave lens, a flat-convex lens, an aspherical lens, and a collimate lens, a rod lens, etc., can be mentioned, and as a filter, for example, a multilayer filter, a polyimide filter, etc., can be mentioned in addition to a filter for general optical communication.

Next, Embodiment 2 will be explained with reference to FIG. 2 and FIG. 3.

FIG. 2 is a perspective view showing Embodiment 2 of an optical connection structure of the present invention, and FIG. 3 is a plane view showing Embodiment 2 of an optical connection structure of the present invention.

Reference numerals 11a to 14a, and 11b to 14b, indicate optical fibers, reference numeral 15a indicates an optical fiber tape core consisting of 4 cores which is an optical transmission medium, reference numeral 15b indicates an optical fiber tape core consisting of 4 cores, which is the other optical transmission medium, reference numerals 47a and 47b indicate guide pins, reference numerals 75a and 75b indicate an MT connector, and reference symbol H indicates a guide pin insertion hole.

In FIG. 2, an adhesive connecting member 22 is intervened at a connecting surface between the MT connector 75a and the MT connector 75b.

Figure 2A:
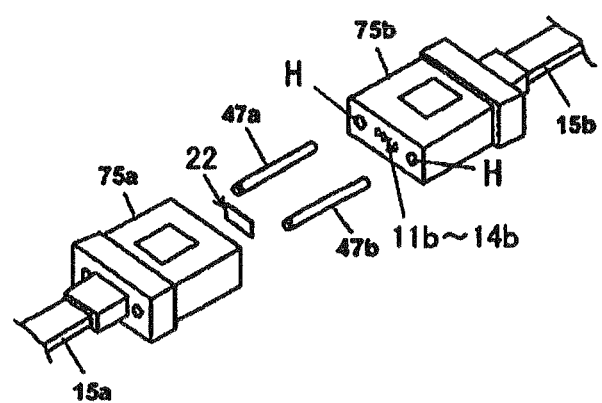
FIG. 2 is a perspective view showing Embodiment 2 of an optical connection structure using an adhesive connecting member of the present invention.
Figure 2B:
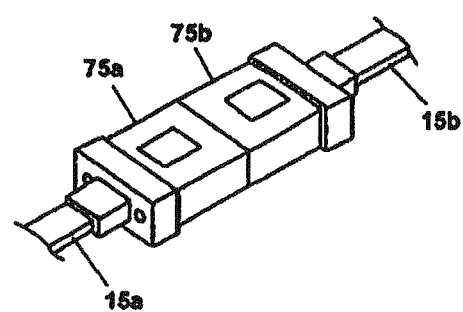

As shown in FIG. 2A, two MT connector 75a and MT connector 75b are positioned by guide pins 47 and are contacted by way of an adhesive connecting member 22, and thereby, as shown in FIG. 2B, optical fiber tape cores 15a and 15b are optically connected.

Here, the MT connector 75a and the adhesive connecting member 22 are firmly adhered.

The adhesive connecting member 22 and the MT connector 75b are not adhered.

Therefore, the adhesive connecting member 22 and the MT connector 75b are separated by pulling down the MT connector 75a and the MT connector 75b, and as a result, the positioning can be easily retried.

Here, the adhesive connecting member 22 is contacted to the MT connector 75b at every positioning; however, since it is contacted by the rubber member 22b having a remarkably higher hardness than that of the adhesive, it is therefore not broken.

Furthermore, the present invention will be explained with reference to FIG. 3.

Figure 3A:
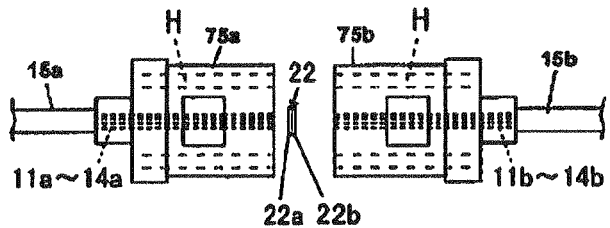
FIG. 3 is a plane view showing Embodiment 2 of an optical connection structure using an adhesive connecting member of the present invention.

As shown in FIG. 3A, the adhesive connecting member 22 is arranged between the MT connector 75a and the MT connector 75b.

Figure 3B:
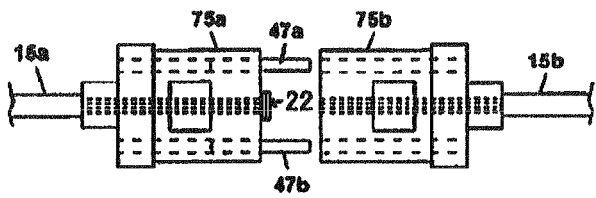

Next, as shown in FIG. 3B, the adhesive connecting member 22 is adhered to the MT connector 75a. In this case, the adhesive 22a is arranged so as to contact with the MT connector 75a.

Figure 3C:
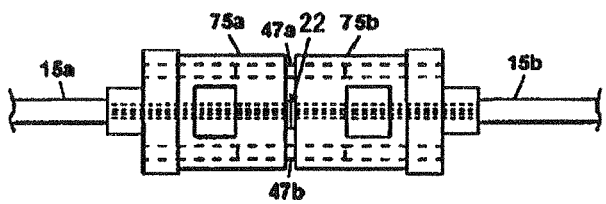

Then, the MT connector 75a and the MT connector 75b are contacted by way of the adhesive connecting member 22, as shown in FIG. 3C, while the positioning is carried out by inserting the guide pins 47a and 47b into the guide pin insertion hole H. Thereby, the rubber member 22b of the adhesive connecting member 22 and the MT connector 75b are contacted, and as a result, an optical connection structure is produced.

A slight gap in contact angle is generated even if the guide pins 47a and 47b for positioning are used, and therefore, according to the present invention, a suitable connection can be easily carried out by retrying the positioning, and thereby, operations at a working site can be drastically reduced.

Next, Embodiment 3 of the present invention will be explained with reference to FIG. 4.

Figure 4:
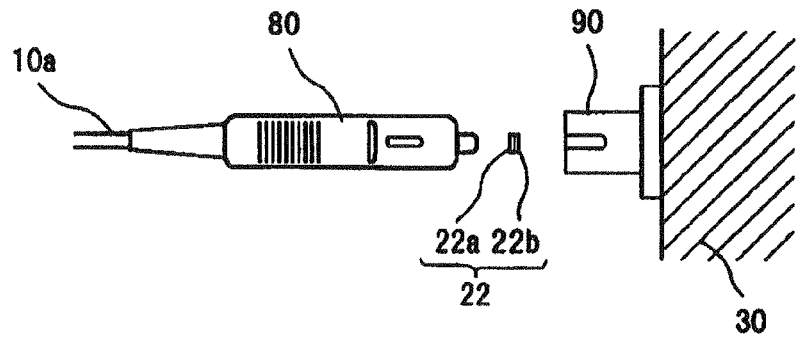
FIG. 4 is a plane view showing Embodiment 3 of an optical connection structure using an adhesive connecting member of the present invention.
Figure 5:
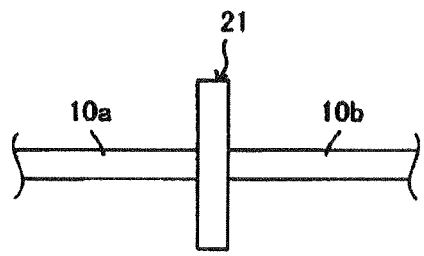
FIG. 5 is a side view showing an optical connection structure using a conventional adhesive connecting member.

FIG. 4 is a plane view showing Embodiment 3 of an optical connection structure of the present invention.

Reference numeral 30 indicates an optical component, reference numeral 80 indicates an SC connector, and reference numeral 90 indicates an adapter for an SC connector.

As shown in FIG. 4, the adhesive connecting member 22 is arranged between the SC connector 80 and the adapter 90 for an SC connector.

Then, the adhesive connecting member 22 is adhered to the SC connector 80. In this case, an adhesive 22a is arranged so as to contact the SC connector 80.

Next, the SC connector 80 is inserted into the adapter 90 for an SC connector, and is contacted by way of the adhesive connecting member 22 to an optical component 30. Thereby, the rubber member 22b of the adhesive connecting member 22 and the optical component 30 are contacted, and the optical connection structure is produced.

The adhesive connecting member 22 of the present invention is not broken, even if it is used for a connector which is strongly contacted, such as an SC connector, an LC connector, etc., since it is contacted by the rubber member 22b having a remarkably higher hardness than that of the adhesive.

Next, a production method for the adhesive connecting member of the present invention will be explained.

The rubber member is laminated on one protection film such as a PET film, the adhesive is applied to the rubber member, and then, another protection film such as a PET film is laminated on the adhesive, and the adhesive connecting member is thereby produced.

Here, the protection film is not always used; however, it is preferable that the adhesive connecting member be produced using the protection film and the protection film be separated when the adhesive connecting member is used, from a viewpoint of prevention from staining and easy handling.

Next, a production method of the optical connection structure of the present invention will be explained.

An adhesive connecting member is cut to a desired size, and an adhesive of the adhesive connecting member is contacted with (a) an optical transmission medium or an optical component, and then a rubber member of the adhesive connecting member is contacted with (b) another optical transmission medium or another optical component, and thereby, the optical connection structure of the present invention is produced. Here, the order of the contact is not limited to the above.

Of course, even when the positioning has failed, (a) an optical transmission medium or an optical component and (b) another optical transmission medium or another optical component, can be easily reconnected, since the rubber member and (b) the other optical transmission medium or the other optical component are peeled off by pulling back (a) an optical transmission medium or an optical component.

EXAMPLES

In the following, the present invention will be explained by using Examples.

Example 1

First, an adhesive connecting member was produced as follows.

As a material of the adhesive, a material A was prepared.
Material A

Acrylic adhesive α (100 weight parts)+epoxy hardener (0.05 weight parts) (adhesive strength: 1767 gf/25 mm, refractive index at 20° C.: 1.463)

Here, the refractive index was measured by using a light source having a wavelength of 1310 nm (hereinafter the same shall apply).

As a material of the rubber member, a material X was prepared.
Material X

Copolymer having a polystyrene-poly(ethylene/propylene)block-polystyrene structure (styrene content: 18 weight %, type A durometer hardness by JIS: 67, refractive index at 20° C.: 1.428)

The material X was applied at a thickness of 5 μm on a PET film having a thickness of 50 μm.

Then, the material A was applied at a thickness of 15 μm on the surface of the material X, and a PET film having a thickness of 50 μm was laminated thereon, and therefore, an adhesive connecting member of Example 1 was produced.

Next, an optical connection structure was produced as follows.

First, the above adhesive connecting member was cut at a predetermined size, and a connecting surface of an SC connector (produced by Sumitomo Electric Industries Ltd., trade name: single core optical connector SC) which holds a quartz type single-mode optical fiber (produced by Sumitomo Electric Industries Ltd., outer diameter: 0.25 mm, refractive index at 20° C.: 1.452) was contacted with and adhered to an adhesive of the adhesive connecting member. Then, the SC connector was connected with a measuring apparatus (produced by Advantest Corporation, trade name: OPTICAL MULTI POWER METER Q8221), which was an optical component, by way of an adapter for an SC connector (produced by Sumitomo Electric Industries Ltd., trade name: optical adapter SC-SC (plastic)). Thereby, the rubber member in the adhesive connecting member and the measuring apparatus were contacted, and the optical connection structure of Example 1 was produced.

Example 2

An adhesive connecting member and an optical connection structure of Example 2 were produced in the same manner as that of Example 1, except that a material B was used as a material of the adhesive instead of the material A.
Material B Acrylic adhesive β (100 weight parts)+isocyanate hardener (tolylene diisocyanate-trimethylol propane adduct) (0.9 weight parts) (adhesive strength: 148 gf/25 mm, refractive index at 20° C.: 1.464)

Example 3

An adhesive connecting member and an optical connection structure of Example 3 were produced in the same manner as that of Example 1, except that a material C was used as a material of the adhesive instead of the material A.
Material C Acrylic adhesive β (86 weight parts)+fluorocarbon resin (14 weight parts)+isocyanate hardener (tolylene diisocyanate-trimethylol propane adduct) (0.77 weight parts) (adhesive strength: 182 gf/25 mm, refractive index at 20° C.: 1.457)

Example 4

An adhesive connecting member and an optical connection structure of Example 4 were produced in the same manner as that of Example 1, except that a material Y was used as a rubber member instead of the material X.
Material Y Copolymer having a polystyrene-poly(ethylene/butylene)block-polystyrene structure (styrene content: 30 weight %, type A durometer hardness by JIS: 77, refractive index at 20° C.: 1.479)

Example 5

An adhesive connecting member and an optical connection structure of Example 5 were produced in the same manner as that of Example 1, except that a material V was used as a rubber member instead of the material X.
Material V Acrylic rubber (produced by Unimatec Co., Ltd., trade name: NOXTITE A-5098, refractive index: 1.48, Tg: −17° C., Mooney viscosity $ML_{1+4}$ (100° C.): 55, transmittance in a thickness of 15 μm at a wavelength of 850 to 1700 nm: 91%, type A durometer hardness by JIS: 65)

Here, the transmittance was measured by using a spectrophotometer (produced by Shimadzu Corporation, trade name: UV-PC3100) (hereinafter the same shall apply).

Example 6

An adhesive connecting member and an optical connection structure of Example 5 were produced in the same manner as that of Example 1, except that a material W was used as a rubber member instead of the material V.
Material W Acrylic rubber (produced by Leon Corporation, trade name: Nipol AR-71, refractive index: 1.46, Tg: −15° C., Mooney viscosity $ML_{1+4}$ (100° C.): 50, transmittance in a thickness of 15 μm at a wavelength of 850 to 1700 nm: 91%, type A durometer hardness by JIS: 71)

Example 7

An adhesive connecting member and an optical connection structure of Example 7 were produced in the same manner as that of Example 6, except that a material C was used as a material of the adhesive instead of the material A.
Material C Acrylic adhesive β (86 weight parts)+fluorocarbon resin (14 weight parts)+isocyanate hardener (tolylene diisocyanate-trimethylol propane adduct) (0.77 weight parts) (adhesive strength: 182 gf/25 mm, refractive index at 20° C.: 1.457)

Example 8

An adhesive connecting member and an optical connection structure of Example 8 were produced in the same manner as that of Example 5, except that a material Z was used as a rubber member instead of the material V.

Material Z

Acrylic rubber (produced by Zeon Corporation, trade name: Nipol AR-53L, refractive index: 1.47, Tg: −32° C., Mooney viscosity $ML_{1+4}$ (100° C.): 34, transmittance in a thickness of 15 μm at a wavelength of 850 to 1700 nm: 93%, type A durometer hardness by JIS: 74)

Example 9

An adhesive connecting member and an optical connection structure of Example 9 were produced in the same manner as that of Example 5, except that a rubber member having a thickness of 15 μm was used.

Example 10

An adhesive connecting member and an optical connection structure of Example 10 were produced in the same manner as that of Example 5, except that a rubber member having a thickness of 35 μm was used.

Example 11

An adhesive connecting member and an optical connection structure of Example 11 were produced in the same manner as that of Example 5, except that a rubber member having a thickness of 2 μm was used.

Example 12

An adhesive connecting member and an optical connection structure of Example 12 were produced in the same manner as that of Example 5, except that a rubber member having a thickness of 0.5 μm was used.

Comparative Example 1

An adhesive connecting member and an optical connection structure of Comparative Example 1 were produced by using only the material A.

Comparative Example 2

An adhesive connecting member and an optical connection structure of Comparative Example 2 were produced by using only the material B.

Comparative Example 3

An adhesive connecting member and an optical connection structure of Comparative Example 3 were produced by using only the material C.

With respect to the optical connection structures of Examples and Comparative Examples, the materials used are shown in Table 1.

TABLE 1

|  | Adhesive | Rubber member | Thickness of rubber member (μm) |
| --- | --- | --- | --- |
| Example 1 | Material A | Material X | 5 |
| Example 2 | Material B | Material X | 5 |
| Example 3 | Material C | Material X | 5 |
| Example 4 | Material A | Material Y | 5 |
| Example 5 | Material A | Material V | 5 |
| Example 6 | Material A | Material W | 5 |
| Example 7 | Material C | Material W | 5 |
| Example 8 | Material A | Material Z | 5 |
| Example 9 | Material A | Material V | 15 |
| Example 10 | Material A | Material V | 35 |
| Example 11 | Material A | Material V | 2 |
| Example 12 | Material A | Material V | 0.5 |
| Comparative Example 1 | Material A |  | — |
| Comparative Example 2 | Material B |  | — |
| Comparative Example 3 | Material C |  | — |

The optical connection structures of the Examples and the Comparative Examples were evaluated by the following methods.

Evaluation Methods

Initial Optically Connecting Loss

A connecting surface of an SC connector (produced by Sumitomo Electric Industries Ltd., trade name: single core optical connector SC) which holds a quartz type single-mode of an optical fiber (produced by Sumitomo Electric Industries Ltd., outer diameter: 0.25 mm, refractive index at 20° C.: 1.452) was polished, and this was then connected with a measuring apparatus which was an optical component, by way of an adapter for an SC connector (produced by Sumitomo Electric Industries Ltd., trade name: optical adapter SC-SC (plastic)). A light from an LED of 1550 nm was emitted from the tip of the optical fiber, and the power of the light emitted to the measuring apparatus was measured as a standard value.

Next, with respect to the optical connection structures of the Examples and the Comparative Examples, a light from an LED of 1550 nm was emitted from the tip of the optical fiber, and the power of the light emitted to the measuring apparatus was measured as an initial value.

The difference between the standard value and the initial value was calculated, as an initial optically connecting loss [dB]. Here, when the initial optically connecting loss was within 0.3 dB, there was no problem in practical use, and it was preferably within 0.2 dB.

Frequency of Success Reconnection

With respect to the optical connection structures of the Examples and the Comparative Examples, a light from an LED of 1550 nm was emitted from the tip of the optical fiber, and the power of the light emitted to the measuring apparatus was measured as an initial value.

Next, the connection was once released by detaching the SC connector from the adapter for the SC connector, and then the SC connector was reconnected to the adapter for the SC connector. Subsequently, the power of the light was measured and difference [dB] between the measured value and the initial value was recorded.

When the difference between the measured value and the initial value was within 0.3 dB, it was judged that the reconnection was a success.

Then, the connection release, the reconnection, and the measurement were repeated, until the difference between the measured value and the initial value repeatedly exceeds 0.3 dB or frequency of measurement is 100 times, and the frequency of successful reconnections was examined.

The above results are shown in Table 2.

TABLE 2

| | Initial optically connection loss (dB) | Successful reconnections |
|---|---|---|
| Example 1 | 0.1 | 100 |
| Example 2 | 0.2 | 100 |
| Example 3 | 0.1 | 100 |
| Example 4 | 0.2 | 100 |
| Example 5 | 0.2 | 100 |
| Example 6 | 0.2 | 100 |
| Example 7 | 0.1 | 100 |
| Example 8 | 0.2 | 15 |
| Example 9 | 0.2 | 100 |
| Example 10 | 0.3 | 100 |
| Example 11 | 0.05 | 65 |
| Example 12 | 0.05 | 12 |
| Comparative Example 1 | 0.1 | 0 |
| Comparative Example 2 | 0.1 | 0 |
| Comparative Example 3 | 0.05 | 2 |

Evaluation Results

In Examples 1 to 12, there was no problem in practical use with respect to both of the initial optically connecting loss and the frequency of successful reconnections. In particular, in the Examples 1 to 7 and 9 to 10, the frequency of successful reconnections was superior.

In contrast, in the Comparative Examples 1 to 3, there was no problem in practical use with respect to the initial optically connecting loss; however, there was a problem in practical use since the frequency of reconnection was 2 times or less.

In addition, in Comparative Examples 1 to 3, the adhesive connecting member was broken by releasing the connection, and there was a problem in practical use.

The invention claimed is:

1. An adhesive connecting member optically connecting (a) an optical transmission medium or an optical component and (b) another optical transmission medium or another optical component by intervening between (a) and (b), and having a two or more layers structure comprising an adhesive positioned on a contacting surface of (a) and a rubber member positioned on a contacting surface of (b),
    wherein a refractive index of the adhesive is 1.35 to 1.55, a refractive index of the rubber member is 1.35 to 1.55, and the rubber member has type A durometer hardness by Japan Industrial Standard of 50 to 100.

2. The adhesive connecting member according to claim 1, wherein the rubber member is a styrenic rubber.

3. The adhesive connecting member according to claim 1, wherein the rubber member is a copolymer having a polystyrene-poly(ethylene/propylene)block-polystyrene structure or copolymer having a polystyrene-poly(ethylene/butylene)block-polystyrene structure.

4. The adhesive connecting member according to claim 1, wherein the rubber member has a styrene content of not less than 1 and less than 50 weight %.

5. The adhesive connecting member according to claim 1, wherein the rubber member has a thickness of 1 to 30 μm.

6. The adhesive connecting member according to claim 1, wherein the ratio of thickness of the rubber member and the adhesive is 1:1 to 1:3.

7. The adhesive connecting member according to claim 1, wherein the rubber member is made of an acrylic rubber.

8. The adhesive connecting member according to claim 7, wherein the acrylic rubber has a glass transition temperature (Tg) of −30° C. or more.

9. The adhesive connecting member according to claim 7, wherein the acrylic rubber has a Mooney viscosity $ML_{1+4}$ (100° C.) of 40 or more.

10. The adhesive connecting member according to claim 7, wherein the acrylic rubber has a transmittance at a wavelength of 850 to 1700 nm of 85% or more.

11. The adhesive connecting member according to claim 1, wherein the adhesive comprises acrylic adhesive and hardener, and the hardener is an epoxy hardener or isocyanate hardener.

12. An optical connection structure in which (a) an optical transmission medium or an optical component and (b) another optical transmission medium or another optical component are connected by way of an adhesive connecting member,
    wherein the adhesive connecting member has a two or more layers structure comprising an adhesive positioned on a contacting surface of (a) and a rubber member positioned on a contacting surface of (b), and the rubber member has type A durometer hardness by Japan Industrial Standard of 50 to 100.

* * * * *